Figure 7:
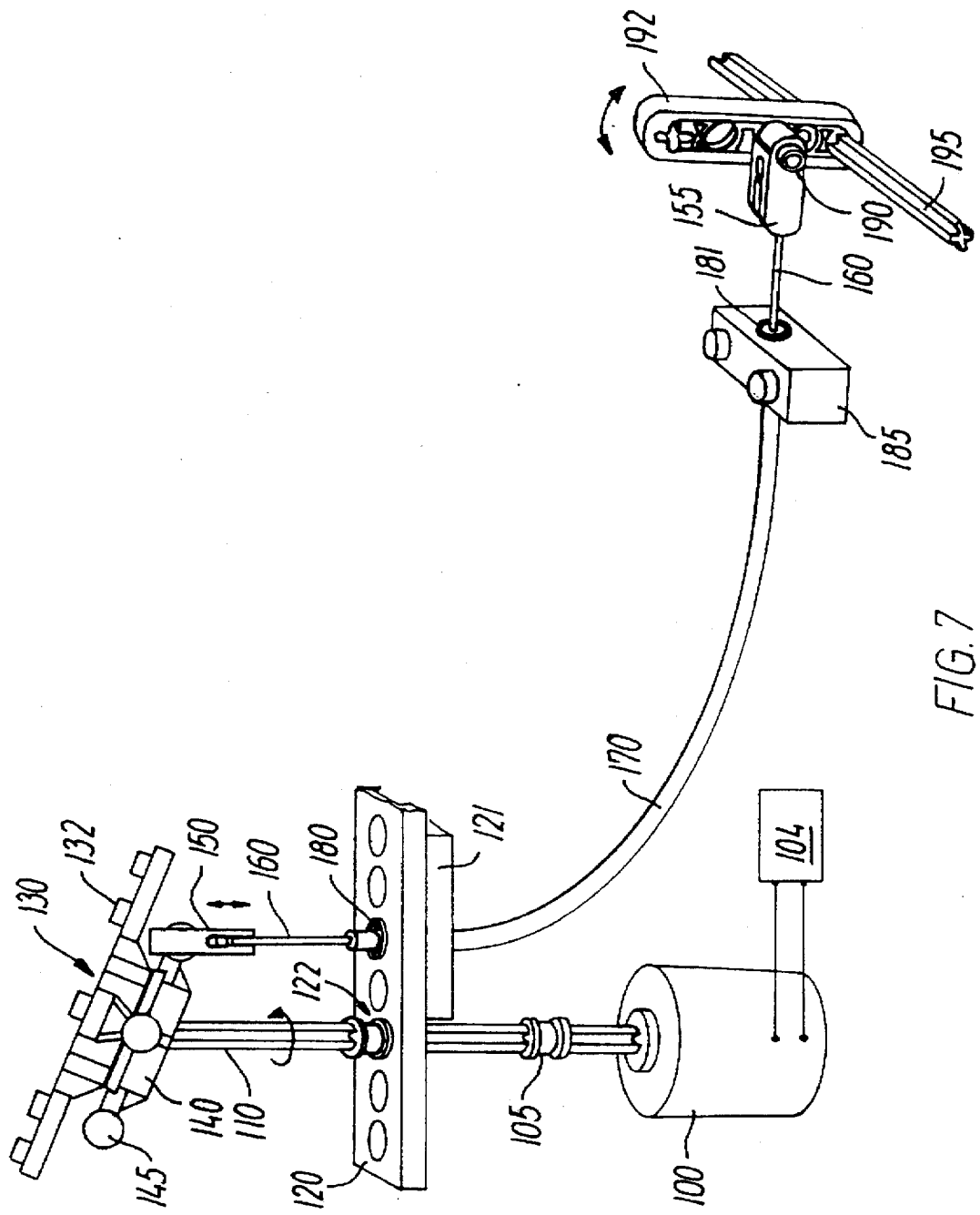

United States Patent [19]

Poulsen et al.

[11] Patent Number: 5,733,168
[45] Date of Patent: Mar. 31, 1998

[54] COUPLING MECHANISM FOR A TOY BUILDING SET

[75] Inventors: Ole Vestergaard Poulsen; Jørgen Thøgersen, both of Vejle, Denmark

[73] Assignee: INTERLEGO AG, Baar, Switzerland

[21] Appl. No.: 684,123

[22] Filed: Jul. 18, 1996

Related U.S. Application Data

[63] Continuation of Ser. No. 412,082, Mar. 23, 1995, abandoned, which is a continuation of Ser. No. 70,404, Jun. 4, 1993, abandoned.

[30] Foreign Application Priority Data

Dec. 4, 1990 [DK] Denmark .................................. 2875/90

[51] Int. Cl.⁶ .............................. A63H 33/08; F16C 1/22
[52] U.S. Cl. ..................... 446/120; 446/104; 446/107; 446/127; 403/294; 74/502.6
[58] Field of Search .................................. 446/102, 104, 446/107, 119, 120, 126, 127, 121; 403/294, 302, 301, 314, 122, 133; 74/502.6

[56] References Cited

U.S. PATENT DOCUMENTS

| | | |
|---|---|---|
| 1,843,115 | 2/1932 | Ferris . |
| 2,027,885 | 1/1936 | Schwarzbach . |
| 2,383,441 | 8/1945 | Beile . |
| 2,414,716 | 1/1947 | Carson . |
| 2,633,662 | 4/1953 | Nelson . |
| 2,752,726 | 7/1956 | Calverley . |
| 2,833,082 | 5/1958 | Carson . |
| 3,458,949 | 8/1969 | Young . |
| 3,570,324 | 3/1971 | Conrad . |
| 3,747,261 | 7/1973 | Salem . |
| 3,756,734 | 9/1973 | Nicholls . |
| 4,037,978 | 7/1977 | Connelly . |
| 4,044,497 | 8/1977 | Bettens . |
| 4,388,012 | 6/1983 | Erickson . |
| 4,733,648 | 3/1988 | Martin . |
| 4,847,973 | 7/1989 | Lundeen . |

FOREIGN PATENT DOCUMENTS

| | | |
|---|---|---|
| 64619/80 | 5/1985 | Australia . |
| 284311 | 9/1988 | European Pat. Off. . |
| 1475308 | 2/1967 | France . |
| 2556791 | 6/1985 | France . |
| 1603295 | 8/1970 | Germany . |
| 2251951 | 11/1973 | Germany . |
| 2410051 | 9/1975 | Germany . |
| 2637136 | 3/1977 | Germany . |
| 3524467 | 1/1986 | Germany . |
| 351369 | 11/1972 | Sweden . |
| 430950 | 11/1980 | Sweden . |
| 483819 | 2/1970 | Switzerland . |
| 866557 | 4/1961 | United Kingdom . |
| 1158679 | 7/1969 | United Kingdom . |

*Primary Examiner*—Mickey Yu
*Attorney, Agent, or Firm*—Kane,Dalsimer,Sullivan,Kurucz,Levy,Eisele and Richard, LLP

[57] ABSTRACT

A coupling mechanism comprises a rod-shaped object (10) and a coupling head (20, 30) and is adapted to be used in a toy building set containing various building elements with other types of coupling means, e.g. bushings or ball heads. The rod-shaped object (10) has at least one terminal part (12–15) adapted to be releasably engaged with the coupling head (20, 30). The terminal part (12–15) is adapted to be received between two resilient walls (27, 37) on the coupling head (20, 30). The coupling head (20, 30) has secondary coupling means (21, 31) for connection with other parts belonging to the toy building set.

15 Claims, 3 Drawing Sheets

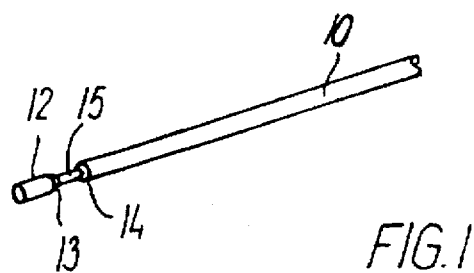
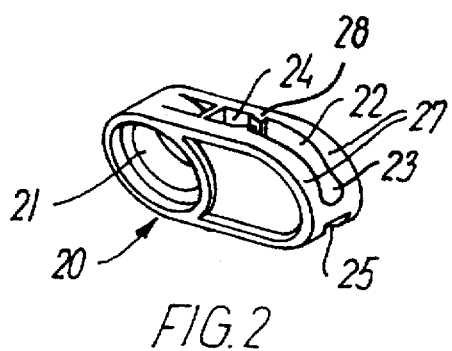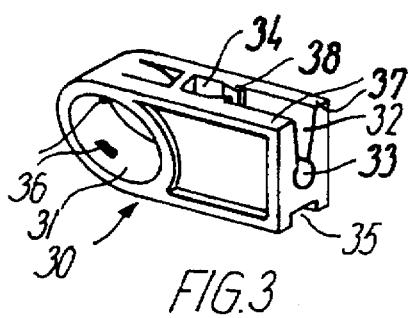
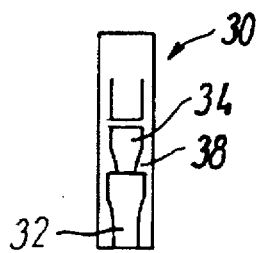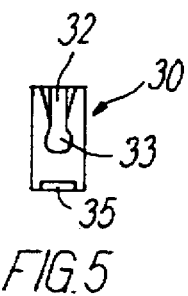
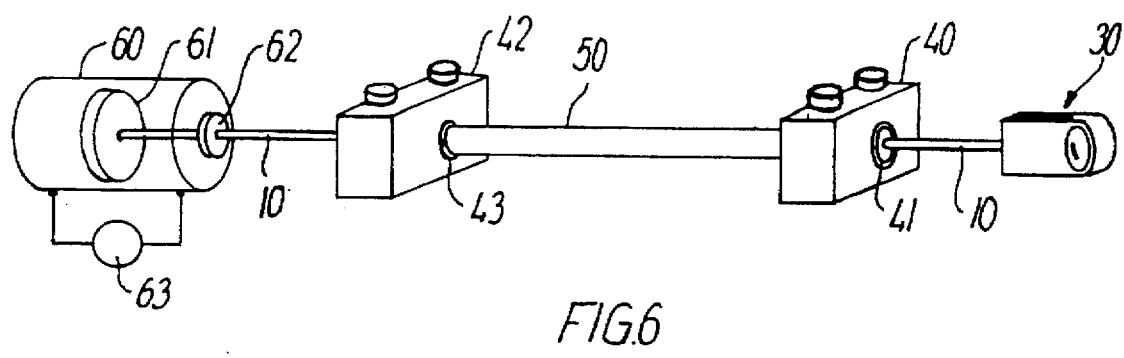

COUPLING MECHANISM FOR A TOY BUILDING SET

This application is a continuation of Ser. No. 08/412,082 filed Mar. 23, 1995 now abandoned which is a continuation of Ser. No. 08/070,404 field Jun. 4, 1993, now abandoned.

The invention concerns a coupling mechanism with a rod-shaped object and a coupling head, said coupling mechanism being adapted to be used in a toy building set containing various building elements with other types of coupling means, e.g. bushings and ball heads.

Owing to the technological development in the field of toy building sets making it possible to build more and more complex constructions, there is a need for simple building elements which are adapted to transfer pressure/pull forces, partly for stiffening static constructions, partly for moving the parts of the construction with respect to each other. This mutual movement has so far been performed by a combination of shafts and gear wheels, while the static stiffening has taken place with the known components of the toy building set, which has resulted in constructions which are more compact than is often desirable.

Transmission of forces in the mechanical world is often performed by means of quite thin, flexible cables, e.g. Bowden cables, which are used e.g. in gear and brake cables in bicycles where twisted steel wires are adapted to move within a flexible envelope. The travel of the inner cable with respect to the envelope may then be used for controlling the position of movable parts. The spokes of a bicycle wheel are an example of the use of such thin, cable-like bodies for mechanical stiffening.

However, constructions of this type are not suitable for use in toy building sets, since consideration has been paid to the forces occurring in practice when constructing the cables and when arranging the means used for fixing the cables to the construction in general, while mounting is often difficult and requires the experience of a skilled person.

Swedish patent No. 351,369 describes a flexible building element for a toy building set. The building element has a coil spring terminated at each end by a coupling head which can be coupled with the other elements of the toy building set. The coil spring and the coupling heads form an integral part and it is thus not possible to change the coupling heads.

The object of the invention is therefore to provide a coupling mechanism which is to be used in an existing toy building set for transferring forces between various elements in constructions built with the toy building set, e.g. for transferring pressure, pull and rotation between the individual construction elements or e.g. for stabilizing a static construction built with the toy building set, where such a coupling mechanism must of course be easy to mount and be connectible with various building elements in the toy building set.

This object is achieved in that the rod-shaped object has at least one terminal part adapted to releasably engage the coupling head, said terminal part being adapted to be received between two resilient walls on the coupling head, and that the coupling head has secondary coupling means for coupling with other parts belonging to the toy building set. This provides a releasable connection between the rod-shaped object and the coupling head, e.g. in the form of a snap action whereby these two parts can easily be engaged with and disengaged from each other.

The secondary coupling means of the coupling head may e.g. comprise a cylindrical eye adapted to receive a cylindrical bushing, or having two axially spaced stop means inside the eye so that a ball head can be received rotatably.

In the preferred embodiment, the rod-shaped object has a circular cross-section and a constriction spaced from the end to receive the terminal part. At least one of the resilient walls of the coupling head has a collar transversely to the axial direction of the rod-shaped object. Upon interconnection of two parts of the coupling mechanism, this collar will counteract axial movement of the rod-shaped object with respect to the coupling head. To stiffen the coupling head, the two resilient walls are normally connected by a portion of material extending in the axial direction of the rod-shaped object. When coupled with the coupling head, the rod-shaped object can then be caused to engage said portion of material.

The rod-shaped object may be adapted to be passed through a tubular liner or envelope with an internal diameter corresponding to the diameter of the object. This is feasible when the rod-shaped object is formed with a terminal part whose diameter is smaller than or equal to the diameter of the rest of the rod-shaped object. Thus, the rod-shaped object may be used as a type of Bowden cable where the travel of the cable with respect to the end point of the liner may be used for displacing parts in a construction built with the toy building set. The cable liner may advantageously be attached in a bushing whose outer diameter corresponds to other parts incorporated in the toy building set, so that the cable lining may be fixed in existing building elements. Since the coupling head can easily be released from the rod-shaped object, it is the diamter of the cable liner which puts a limit to the type of components through which the cable can be passed. The rod-shaped object preferably has a terminal part at each end so that a coupling head may be mounted at each end. However, in some cases it is expedient that one end of the rod-shaped object is an integral part of a component incorporated in the toy building set. It may thus be connected directly to the piston rod in a pressure operated cylinder.

However, the rod-shaped object may also be formed with a terminal part having e.g. a four-sided cross-section, so that the coupling mechanism will be able to transfer torsion or rotation between two construction parts. If only the rod-shaped object is to be used for static stiffening, i.e. without cable liner, the terminal part of the rod-shaped object may be formed with a diameter greater than the rest of the object, so that there is no need for passing the object through a narrow envelope.

Figure 8:
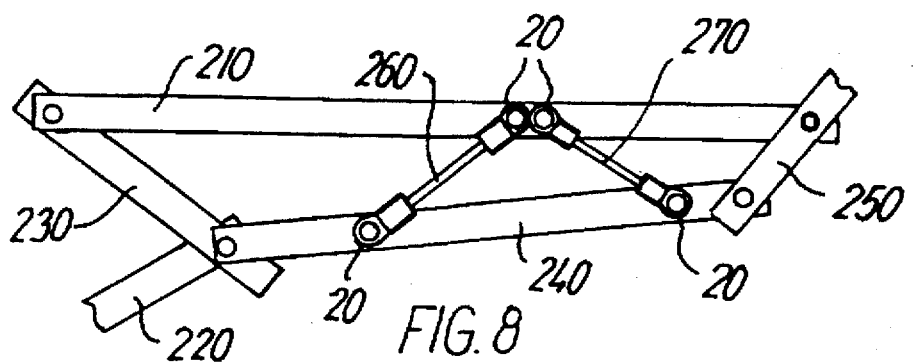
Figure 9:
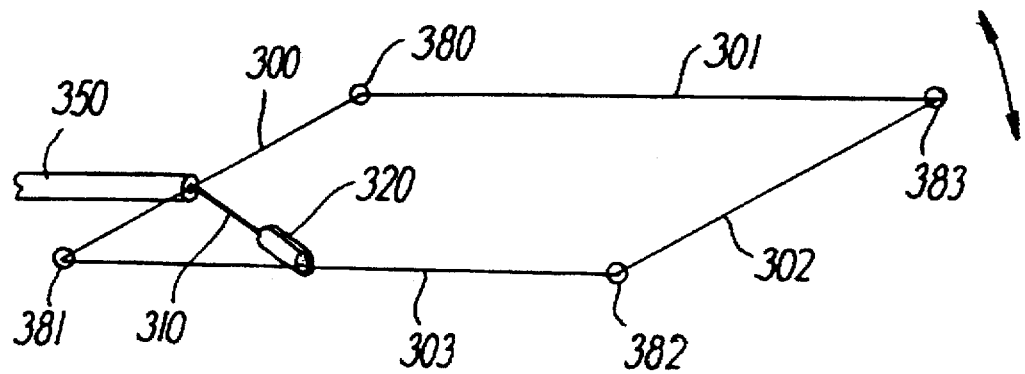
Figure 10:
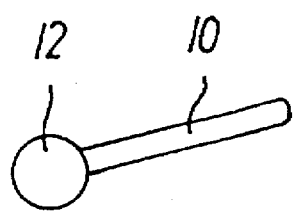
Figure 11:
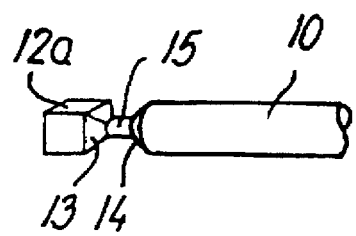

The invention will be explained more fully below with reference to the drawing, in which FIG. 1 shows a preferred embodiment of a cable end with a terminal part according to the invention, FIG. 2 shows an embodiment of a coupling head according to the invention, FIG. 3 shows a second embodiment of a coupling head according to the invention, FIG. 4 is a lateral view of the coupling head shown in FIG. 3, FIG. 5 is an end view of the coupling head shown in FIGS. 3 and 4, FIG. 6 shows an application of the coupling mechanism according to the invention, FIG. 7 shows a second application of a coupling mechanism according to the invention, FIG. 8 shows a third application of a coupling mechanism according to the invention, FIG. 9 schematically shows a fourth application of a coupling mechanism according to the invention, FIG. 10 shows an alternative embodiment of a rod-shaped object according to the invention, and FIG. 11 shows a further alternative of a rod-shaped object according to the invention.

FIG. 1 shows a preferred embodiment of a rod-shaped object 10 for a coupling mechanism according to the invention. The rod-shaped object 10 has a terminal part consisting of a constriction 15 which forms an integral part of the rod-shaped object 10. The constriction 15 is connected to the end 12 and main body of the rod-shaped object 10, respectively, by two frusto-conical parts 13, 14. In a preferred embodiment, the rod-shaped object 10 has a maximum diameter corresponding to the diameter of the main body.

FIG. 2 shows a coupling head 20 for the coupling mechanism, where the coupling head 20 has two resilient walls 27 adapted to releasably receive and retain the terminal part of the rod-shaped object 10. The coupling head 20 is a flat, oval body with a cylindrical, through-going eye 21 at one end, which is adapted to rotatably receive and retain a cylindrical bushing on another building element incorporated in the toy building set. A circular channel 23 is provided between the two resilient walls 27 in the longitudinal direction of the coupling head 20, said channel serving to receive the terminal part of the rod-shaped object 10. A cavity is formed between the resilient walls 27 on the coupling head 20 and is divided into an inner part 24 and an outer part 22, between which a collar 28 is provided, extending between the cavities 22, 24 transversely to the longitudinal direction of the coupling head 20. The coupling head 20 is typically manufactured by injection moulding of a plastics material, so the coupling head 20 may in certain areas be formed with recesses 25 to reduce the wall thickness and to thereby achieve the best possible product.

FIG. 3 shows a coupling head 30 substantially corresponding to the one shown in FIG. 2, where a cylindrical eye is adapted to rotatably receive a ball head; the eye therefore has two axially spaced stop means 36 which may e.g. consist of two spaced rings or, as is the case here, parts of two such rings. Two resilient walls 37 form an outer and an inner cavity 32, 34 separated by a collar 38. A rod-shaped object 10, displaced laterally, may be received in a substantially circular channel 23 which forms the rear wall of the cavities 32, 34 formed by the resilient flaps 37. Heretoo, some recesses 35 of reduced thickness may be provided owing to the wall thickness.

FIGS. 4 and 5 are a lateral view and an end view, respectively, of the coupling head 30 shown in FIG. 3. It is seen in FIG. 4 how the inner part 34 of the cavity formed by the resilient walls 37 has the shape of the end 12 on the rod-shaped object 10. The width of the cavity 34, i.e. the distance between the two resilient walls 37 in this part, is constant in the entire depth of the cavity. Thus, the end 12 on the rod-shaped object 10 will not meet with any resistance until it reaches the rear wall of the inner part 34 of the cavity. It is seen in FIG. 5 how the outer part 32 of the cavity is hopper-shaped so that the resilient walls 37 of the coupling head 30 are forced apart in this area upon mounting of the rod-shaped object 10. Once the rod-shaped object 10 has been positioned in the cylindrical channel 33, the rod-shaped object can only be disengaged when subjected to strong lateral forces. The collar 38, which separates the inner and outer parts 34, 32 of the cavity, is formed with inclined walls which correspond to the frusto-conical part 13 of the rod-shaped object, so that the collar 38 on the resilient walls 37 will yield when the pull in the rod-shaped object 10 in an axial direction exceeds a certain value, and the rod-shaped object 10 will therefore not be destroyed in case of overloading.

As will be seen from FIGS. 2 and 3, the coupling head 20 for receiving a bushing is oval, while the coupling head 30 for retaining a ball head is U-shaped. A user can hereby readily distinguish between the two types of coupling heads 20, 30.

FIG. 6 shows an application of a coupling mechanism according to the invention, where a coupling head 30 is mounted at one end of a flexible cable 10. The other end of the cable 10 is secured to a piston 61 in a pressure-pull cylinder 60, said cable 10 being passed through an opening in the end plate 62 of the cylinder 60. The cylinder 60 is operated by a pump 63. Two uniform elements 40 and 42, together with the pressure operated cylinder 60, are fixed to a construction built with the toy building set. These two building elements 40, 42 have a circular opening to receive a bushing 41 and 43; respectively. These two bushings 41, 43 retain their respective ends of a tubular envelope 50 with respect to the two building elements 40, 42. The envelope 50 will preferably be flexible and formed with an inside diameter corresponding to the diameter of the rod-shaped object or the cable 10. Since the cable 10 can easily be separated from the coupling head 30, this can easily be passed through with a tubular envelope 50. The cable 10 is passed through the envelope 50 after the envelope has been attached to the building elements 40, 42 by means of the bushings 41, 43. The travel of the piston 61 in the pressure operated cylinder will thus be transferred through the cable 10 so that the coupling head will perform a corresponding travel with respect to the building element 40. This travel may be used for moving other parts (not shown) of the construction.

FIG. 7 shows an example of an application of such a cable construction. The shown construction may e.g. be used for regulating the inclination of a toy helicopter rotor. A power supply and regulation device 104 controls the supply power to an electric motor 100. The electric motor 100 has a drive shaft which through a connector 105 is connected to the rotor shaft of the helicopter. The shaft is moved through a flat building element 120 with holes to receive shafts and bushings. The shaft 120 is retained vertically with respect to the flat building element 120 by means of positioning rings 122 mounted on each side of the flat building element. The shaft 110 is secured to a cardan ball (not shown), which is engaged with carrier pins on an internal cylinder face on a cross-shaped element 130, so that its rotation is provided by the shaft 110. The cross-shaped element 130 has four radially protruding arms with coupling studs 132 with which helicopter blades may be mounted. A guide ring 140 is rotatably journalled about the tubular part of the cross-shaped element 130, so that the guide ring 140 may be used for regulating the inclination of the element 130 with respect to horizontal. The guide ring 140 has four radially protruding arms with ball heads 145. A coupling head 160 of the second type (30) is secured to one of these ball heads 145. As previously mentioned, this coupling head 160 is connected with a flexible cable 160 and is passed into a bushing 180 extending through the flat building element 121 as well as an additional element 122 whereby the bushing will be able to retain a flexible envelope 170, whose other end is secured with a bushing 181 to a building element 185. The cable 160 is attached at its other end to a coupling head 155 of the first type (20), which is secured via a bushing 190 to a lever or swing arm 192 which may be pivoted about a stationary pivot shaft 195. The shaft 195, the building element 185, the building elements 120 and 121 and the electric motor 100 are secured to stationary construction parts which are omitted for the sake of clarity. When the swing arm 192 is pivoted about the shaft 195, the cable 160 will be displaced in the envelope 170, and the rotation about the shaft 195 will result in a linear displacement of the coupling head 160 and thereby change the inclination of the cross-shaped element 130. When connecting one more of the ball heads 145 of the guide ring 140 with a guide device, it is possible to regulate the inclination of the plane spanned by the cross-shaped element. Alternatively, one of the ball heads may be fixed with respect to the flat building element 120, so that the element 130 can now only tilt about an axis.

FIG. 8 shows that the coupling mechanism according to the invention may be used for stiffening stationary constructions, which is exemplified by a tail portion of a helicopter built with the elements of the toy building set. The tail portion is composed of long building elements having through openings to receive shafts. The construction consists of five beams 210, 220, 230, 240, 250 which are coupled together with shafts and bushings to form a substantially trapeziform body constituting the tail of the helicopter. Since the individual beams are rotatably connected with each other, the tail portion will not be stable as such, and two stiffening elements 260, 270 are therefore connected between the two substantially parallel beams 210 and 240. These stiffening elements 260, 270 consist of a cable 10 provided at each end with a coupling head 20, which is secured to respective beams 210, 240 by means of bushings or shafts extending through the openings of the beam.

FIG. 9 schematically shows how a cable construction of the type shown in FIG. 6 may be used for controlling the shape of an otherwise semistatic construction. The construction is formed by four beams 300, 301, 302 and 303 which are rotatably secured to each other through shafts 380, 381, 382 and 383. Thus, the beams 301-303 form a trapezium whose shape may be varied by adjusting the angle between two of the beams 300 and 303 forming part of the parallelogram. A Bowden cable comprises a envelope 360 attached to the beam 300 and an inner cable 310 attached to the beam 303 through a coupling head 320 by means of a bushing. The travel of the inner cable 310 in the envelope 360 will thus be able to adjust the angle between the beam 300 and the beam 303.

FIG. 10 shows an alternative embodiment of a rod-shaped object 10 according to the invention with a terminal part in the form of a ball 12. This rod-shaped object will be useful in connection with static constructions since, in this case, it is not necessary that the object 10 is to be movable through a cable envelope, but is merely to be received in a coupling head. This coupling head must be shaped such that an inner part of the cavity between the flexible walls of the coupling head must be receivable on the ball-shaped terminal part.

FIG. 11 shows an alternative embodiment of the rod-shaped object where the terminal part is here formed with an end part 12a having a square cross-shaped section. The rod-shaped object 10 otherwise corresponds to the rod-shaped object shown in FIG. 1, but owing to the plane faces 12a of the end part, it will be able to transmit rotary movements or torsion if the coupling head is formed with corresponding complementary plane faces.

We claim:

1. A coupling mechanism adapted to be used in a toy building set containing various building elements having secondary coupling means thereon, said coupling mechanism comprising a rod-shaped object and a coupling head, said coupling head having said secondary coupling means thereon for enabling connection of said coupling head to said other building elements and further including a pair of resilient walls, at least one of said walls having a collar extending toward the other of said walls, transversely of an axial direction of said rod-shaped object when positioned within said coupling head, said rod-shaped object having a main portion and at least one terminal part adapted to be received and retained in a releasable engagement between said resilient walls of said coupling head, said terminal part extending to a first end of said rod-shaped object and including a constriction spaced apart from said first end whereby an end portion is defined between said first end and said constriction, wherein said end portion has a cross section larger than a cross section of said constriction and no larger than a cross section of said rod-shaped object main portion, said rod-shaped object main portion and said walls further including surfaces thereon dimensioned to cooperate with each other to resiliently urge said walls transversely apart as said rod-shaped object is urged laterally between said walls and wherein said resilient walls accommodate said rod-shaped object in a snap fit upon lateral insertion of said terminal part therebetween with said collar seated within said constriction whereby said constriction receiving said collar therein resists axial movement of said rod-shaped object relative to said coupling head.

2. A coupling mechanism according to claim 1 wherein said pair of resilient walls are provided on opposite sides of a laterally open cavity extending into said coupling head from a side edge of said coupling head and in the longitudinal direction of said coupling head from an end thereof and said collar comprises a pair of projections, each projection of said pair protruding from a respective one of said pair of resilient walls.

3. A coupling mechanism according to claim 2 wherein the projections protrude in a direction transverse to the longitudinal direction of said cavity and divide said cavity into an outer part and an inner part.

4. The coupling mechanism according to claim 3 wherein said outer part of said laterally open cavity has an entrance from said side edge of said coupling head narrower in cross section than a cross section of said terminal part of said rod-shaped element.

5. The coupling mechanism according to claim 4 wherein said cross-sections of said rod-shaped object on both sides of said constriction are circular.

6. The coupling mechanism according to claim 5 further comprising frustro-conical parts transitioning between said constriction and said rod-shaped object on both sides of said constriction.

7. A coupling mechanism according to claim 1 wherein said secondary coupling means of the coupling head comprises a cylindrical eye.

8. A coupling mechanism according to claim 7 wherein said cylindrical eye has two axially spaced stop means therein for cooperating to rotatably retain a ball head within said eye.

9. A coupling mechanism according to claim 2 wherein said resilient walls are connected by material extending in the axial direction.

10. A coupling mechanism according to claim 1 further comprising a tubular envelope disposed about said rod-shaped object, said tubular envelope having an inside diameter corresponding to a cross-sectional dimension of said terminal part.

11. A coupling mechanism according to claim 1 wherein said rod-shaped object at an end thereof opposite to said terminal part end has integrally formed secondary coupling means.

12. A coupling mechanism according to claim 1 further comprising another terminal part at the end of said rod-shaped object opposite to said rod-shaped object first end.

13. A coupling mechanism according to claim 1 further comprising a plurality of plane faces on said terminal part extending from said first end to said constriction.

14. A coupling mechanism according to claim 13 further comprising an inclined surface transitioning between each of said plane faces and said constriction.

15. A coupling mechanism for a toy building set containing various building elements having secondary coupling means thereon, said coupling mechanism comprising a coupling head and a rod-shaped element adapted to be releasably engaged with said coupling head, said coupling head having secondary coupling means thereon for connecting with other parts of said toy building set wherein i. said coupling head has an open-ended cavity for receiving and retaining an end of said rod-shaped element;
   ii. said cavity extends in an axial direction from an open end to an inner end wall and is defined between a pair of spaced apart side walls;
   iii. integral locking projection means extended inwardly from at least one of said side walls into said cavity;
   iv. said integral locking projection means are axially spaced from said inner end wall, whereby said locking projection means and inner end wall define therebetween an inner locking chamber and said integral locking projection means and cavity open end define therebetween an outer locking chamber;
   v. said side walls are formed with a circular channel therein extending from said locking projection means toward said cavity open end;
   vi. said circular channel having an axis coaxial with a longitudinal axis of said head cavity and extending along said coupling head between said side walls;
   vii. said rod-shaped element having at least one end portion with a generally cylindrical shape;
   viii. an end extremity of said rod-shaped element at at least one end portion having a cross-sectional configuration to be laterally receivable within said inner locking chamber and being locked therein against axial movement;
   ix. said end extremity including an annular groove;
   x. said annular groove being positioned so as to receive said locking projection when said rod-shape element is laterally inserted within said open-ended cavity;
   xi. said channel being dimensioned to closely receive portions of said rod-shaped element;
   xii. said spaced apart sidewalls being sufficiently elastically deflectable so as to accommodate lateral insertion of said rod-shaped element into said cavity;
   xiii. said rod-shaped element having a main body portion and;
   xiv. said rod-shaped element main body portion and said side walls further including surfaces thereon dimensioned to cooperate with each other to resiliently urge said walls transversely apart as said rod-shaped object is urged laterally between said walls.

\* \* \* \* \*